F. E. NELSON.
AIRLESS TIRE.
APPLICATION FILED AUG. 4, 1919.
1,364,790.
Patented Jan. 4, 1921.
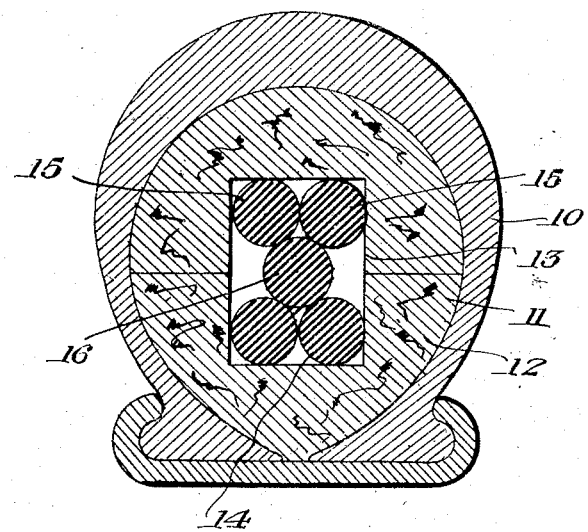
WITNESS:
B. Kirkman
INVENTOR.
BY F. E. Nelson
Victor J. Evans
ATTORNEY.

UNITED STATES PATENT OFFICE.

FRANK E. NELSON, OF CHICAGO, ILLINOIS.

AIRLESS TIRE.

1,364,790.  Specification of Letters Patent.  Patented Jan. 4, 1921.

Application filed August 4, 1919. Serial No. 315,250.

*To all whom it may concern:*

Be it known that I, FRANK E. NELSON, a citizen of the United States, residing at Chicago, in the county of Cook and State of Illinois, have invented new and useful Improvements in Airless Tires, of which the following is a specification.

This invention has reference to vehicle tires and is particularly directed to core structure for casings of pneumatic tires.

The object of the invention is to produce a core for this class of tires which shall be of a construction to obviate the employment of air as a cushioning element, but which at the same time shall be yieldable and shall present all of the advantages of an ordinary air containing inner tube and at the same time protect the tire against punctures.

An object of the invention is to produce an inner core for pneumatic tire casings, comprising an outer member of light yieldable material, such as cork, an inner member in the nature of cross sectionally rounded rubber rings which are received in and contact with the inner and outer walls of the cork member and with each other so that when pressure is exerted on the tire casing the same will be absorbed by the elements constituting a core which also prevents the collapse of the casing and serving as buffers for absorbing shocks and jars to which the tire casing is subjected.

The foregoing objects, and others which will appear as the nature of the invention is better understood may be accomplished by a simple construction, combination and arrangement of parts such as is illustrated in the drawings.

In the drawings:

The figure of the drawing illustrates a cross sectional view through a tire casing having a core therein constructed in accordance with this invention.

In the showing of the drawings an outer tire casing is indicated by the numerals 10.

In the casing, and snugly engaging the same is my improved core construction. The core is broadly indicated by the numeral 11, but the same comprises inner and outer members. The outer member 12 of the core is constructed of cork or similar light yieldable material, and comprises two sections that have their confronting surfaces contacting. Each of the sections is centrally formed with a continuous opening 13 the side walls of which being straight and are parallel, while the inner walls are arranged right angularly with respect to the side walls.

The inner members of the core are in the nature of cross sectionally round rings. Two of these rings indicated by the numerals 14 are arranged in contacting engagement with the inner and side walls of the opening in the inner section of the outer core member. Two rings 15, of a greater circumference than the rings 14 are arranged in contact with the inner wall and with the side walls of the opening in the sectional cork member 11, while the remaining ring 16 is arranged centrally between and in contacting engagement with the said outer rings 14 and 15.

A core for tire casings as above described is light, but by the employment of the rubber rings, possesses sufficient resiliency to hold the casing properly expanded and to absorb shocks and jars to which the casing is subjected.

Having thus described the invention, what is claimed as new, is :—

A core for tire casings comprising an outer annular member constructed of cork or similar like material and comprising two sections which have their confronting edges contacting, said outer member having a central substantially rectangular continuous opening therethrough, the inner member of the core comprising cross sectionally rounded rubber rings, two of which are seated at the outer corners of the opening, contacting with the walls provided by the opening, two others of which are seated at the inner corners of the opening and are in contacting engagement with the walls thereof, and the remaining ring member being arranged centrally and in contacting engagement with the first mentioned pairs of ring members.

In testimony whereof I affix my signature.

FRANK E. NELSON.